United States Patent [19]

Igarashi et al.

[11] Patent Number: 5,631,415
[45] Date of Patent: May 20, 1997

[54] AIR FLOW RATE MEASURING DEVICE

[75] Inventors: Shinya Igarashi; Hiroshi Hirayama; Chihiro Kobayashi, all of Katsuta; Mitsukuni Tsutsui, Ibaraki-ken; Yukio Kato, Hitachi, all of Japan

[73] Assignees: Hitachi, Ltd.; Hitachi Automotive Engineering Co. Ltd., both of Japan

[21] Appl. No.: 514,851

[22] Filed: Aug. 14, 1995

Related U.S. Application Data

[62] Division of Ser. No. 120,542, Sep. 14, 1993, Pat. No. 5,467,648.

[30] Foreign Application Priority Data

Sep. 17, 1992 [JP] Japan ..................... 4-247626
Sep. 18, 1992 [JP] Japan ..................... 4-249504
Oct. 30, 1992 [JP] Japan ..................... 4-292478
Mar. 18, 1993 [JP] Japan ..................... 5-058371

[51] Int. Cl.$^6$ ..................... G01F 1/68; G01F 5/00
[52] U.S. Cl. ..................... 73/202.5; 73/118.2; 73/202
[58] Field of Search ..................... 73/202, 202.5, 73/204.21, 204.22, 118.2

[56] References Cited

U.S. PATENT DOCUMENTS 4,991,560  2/1991  Arai et al. ..................... 73/204.22

Primary Examiner—Richard Chilcot
Assistant Examiner—Harshad Patel
Attorney, Agent, or Firm—Evenson, McKeown Edwards & Lenahan P.L.L.C.

[57] ABSTRACT

An air flow rate measuring device for measuring intake air flow rate in an automotive engine, improved to reduce any error attributable to variation in the configurations of air cleaner and/or duct forming air passage upstream of the flow rate measuring device, thus offering high accuracy of the flow rate measurement. In one aspect of the invention, the inlet opening of a sub-air passage is disposed to contain the axis of a main air passage, while the outlet opening of the sub-air passage is disposed in the vicinity of a wall defining the main air passage. In order to cause a local reduction of the pressure of the principal of the air flow at the outlet opening, a protrusion or a flat surface which causes impediment to the flow if air in the main air passage is provided immediately upstream of the outlet opening. In another aspect, the inlet surface in which the inlet of the sub-air passage opens is stepped in the direction of flow of the air so as to enable air to be introduced into air flow rate measuring portion in the sub-air passage from different regions in the main air passage while giving a preselected order of preference to these different regions.

8 Claims, 13 Drawing Sheets

MOLD PARTING PLANE

MOLD PARTING PLANE

MOLD PARTING PLANE

MOLD PARTING PLANE

MOLD PARTING PLANE

MOLD PARTING PLANE

AIR FLOW RATE MEASURING DEVICE

This is a divisional of application Ser. No. 08/120,542, filed Sep. 14, 1993 U.S. Pat. No. 5,467,648.

BACKGROUND OF THE INVENTION

1. Field of the Invention

The present invention relates to an air flow rate measuring device of the type which employs a heat-generating resistor and, more particularly, to an air flow rate measuring device of the type described, suitable for use in measuring intake air flow rate in an automotive engine to obtain air flow rate information to be used in the control of fuel injection performed in such an engine.

2. Description of Related Art

A conventional air flow rate measuring device of the type using a heat-generating resistor is disclosed in, for example, Japanese Patent Unexamined Publication No. 2-232524. This conventional device includes a sub-air passage having a recessed inlet and orthogonally bent at a portion downstream of a flow rate measuring portion so as to open in a joining outlet provided in the vicinity of the wall of a main air passage, thereby diminishing output variation in the air flow rate measuring device caused by an offset of flow of the air occurring in the region upstream of the air flow rate measuring device.

This arrangement, however, cannot satisfactorily reduce error or deviation of the measuring output to the minus side caused by offset of air flow of small flowing velocity appearing in the region of the sub-air passage upstream of the flow rate measuring portion, although the reduction in such an error is not absolutely impossible. In addition, the above-described arrangement has not been considered to eliminate influence of an air cleaner or other component which would cause such an offset of the air flow that the velocity is high in the region between the region of the sub-air passage upstream of the flow rate measuring portion and the center of the main air passage. Thus, the above-mentioned known arrangement cannot satisfactorily reduce error or deviation of the measuring output to the plus side which is caused when the above-mentioned offset of the air flow exists.

Thus, the known air flow rate measuring device is not designed for providing sufficiently high measuring accuracy to a variety of arrangement of the conduit upstream of the air flow rate measuring device and a variety of configurations of air cleaner, and is adapted only to a specific configuration of the air cleaner.

Thus, the known air flow rate measuring device can provide measuring accuracy only when it is combined with specific configurations of the conduit upstream of the measuring device. Hitherto, no air flow rate measuring device has been proposed which would provide sufficiently high measuring accuracy adapting to various designs of air cleaner and air duct of automotive engines, through elimination of influence of offset of the air flow, in particular such an offset that the velocity is highest in the central portion of the main air passage as in the case where a straight duct is adopted.

SUMMARY OF THE INVENTION

Accordingly, an object of the present invention is to provide an air flow rate measuring device which can measure air flow rate with a high degree of accuracy, adapting to a variety of forms of the upstream structure, i.e., forms of the air cleaner and duct upstream of the air flow rate measuring device, in particular such a configuration of the upstream structure that develops highest flow velocity in the central portion of the main air passage.

To this end, according to the present invention, there is provided an air flow rate measuring device, comprising: a main air passage for intake air; a sub-air passage which permits part of the air flowing in the main air passage to pass therethrough, the sub-air passage being provided with a flow rate measuring portion disposed therein; and pressure reducing means disposed in the main air passage at a region upstream of the outlet of the sub-air passage so as to reduce pressurize in a region of the main air passage around the outlet of the sub-air passage.

According to the invention, there is also provided an air flow rate measuring device, comprising: a main air passage for intake air; a bridge which is disposed on the axis of the main air passage and which divides the main air passage into a plurality of portions; a sub-air passage formed in the bridge for permitting part of the intake air flowing in the main air passage to pass therethrough, the sub-air passage being provided with a flow rate measuring portion therein and having an inlet opening formed in the upstream end surface of the bridge and at least one outlet provided in the downstream end surface or in lateral side surface of the bridge; and a protrusion provided on a lateral side surface of the bridge at a portion immediately upstream of the outlet.

According to the invention there is also provided an air flow rate measuring device, comprising: a main air passage for intake air; and a sub-air passage for allowing part of air flowing in the main air passage to pass therethrough, the sub-air passage being provided with a flow rate measuring portion therein, the inlet surface in which the inlet of the sub-air passage opens is stepped in the direction of flow of air in the main air passage.

According to the invention there is also provided an air flow rate measuring device, comprising: a main air passage for intake air; sub-air passage for allowing part of the air flowing in the main air passage to pass therethrough, the sub-air passage being provided with a flow rate measuring portion disposed therein; and a partition wall provided in the sub-air passage at a position upstream of the flow rate measuring portion so as to divide space in the sub-air passage into a plurality of sections extending along the axis of the main air passage.

The invention also provides a fuel control system for an internal combustion engine, comprising: an air flow rate measuring device of any one of the types mentioned above; fuel injection means for injecting a fuel at a controlled rate and timing; and a control unit for receiving a signal from the air flow rate measuring device indicative of the flow rate of intake air and for computing the injection rate and timing based on the signal and delivering the result of the computation to the fuel injection means.

In general, a variety of configurations of air cleaners and ducts are assembled on the upstream side of an air flow rate measuring device. Different designs and constructions of the air cleaner and duct causes variation in the different patterns of flow velocity distribution over the cross-section of the air passage upstream of the air flow rate measuring device. Such flow velocity distribution patterns are broadly sorted into three types: a pattern in which flow velocity is substantially uniform over the entire area of the cross-section of the air passage; a stratified or laminate pattern which is caused by, for example, a bend of the duct such that, velocity is higher in the radially outer region of the curvature than in the inner region; and a curve-shaped pattern which is formed by, for example, the presence of a long straight duct such that the flow velocity is highest in the core portion of the passage and lowest in the peripheral region near the wall defining the passage.

No significant error in the measurement is caused when the flow velocity distribution pattern is uniform over the entire cross-sectional area, regardless of the portion of the flow velocity distribution pattern which is subjected to the flow rate measurement. However, when a stratified flow velocity distribution pattern or curve-shaped flow velocity distribution pattern appears on the upstream side of the flow rate measuring device, the measuring output largely varies according to the position of the measurement.

In the stratified flow velocity distribution pattern, variation in the flow velocity is comparatively large in the peripheral region of the air passage near the wall defining the passage but the state of the flow of air in the central region around the axis is substantially the same as that in uniform flow velocity distribution pattern. In view of this fact, in one aspect of the present invention, the inlet opening of the sub-air passage is so positioned as to include the axis of the main air passage so that the air is introduced into the flow rate measuring portion preferentially from the central portion of the main air passage, thus preventing the measuring output from largely shifted or deviated to the minus side, i.e., to the smaller side.

The above-described arrangement, however, cannot suitably be used when the flow velocity upstream of the inlet opening of the sub-air passage is high, as is the case where the curve-shaped flow velocity distribution pattern exists, because in such a case the flow velocity is measured based on the central portion of the flow which exhibits specifically high flow velocity, with the result that the measuring output is shifted to the plus side, i.e., to the greater side. It view of this fact, the present invention in its another aspect proposes to provide an arrangement in which a smaller pressure drop occurs at the joining outlets of the sub-air passage when the velocity of the principal flow of air is low in the region immediately upstream of the joining outlets. This can be achieved by, for example, locating the joining outlets of the sub-air passage at a position which is remote from the inlet opening of the sub-air passage and at which the velocity of air is low, e.g., in the vicinity of the wall defining the main air passage where the flow velocity is low in the case of a curve-shaped flow velocity distribution pattern, and providing protrusions on the side faces of the bridge at positions immediately upstream of the joining outlets. With this arrangement, it is possible to compensate for the shift or deviation of the measuring output which occurs in plus side when the curve-shaped flow velocity distribution pattern exists on the upstream side of the flow rate measuring device.

The pattern of flow velocity distribution varies widely according to factors such as configurations of the air cleaner and duct. In order to achieve sufficiently high degree of accuracy of measurement despite such a variety of distribution patterns, it is necessary to locally adjust the degrees of influence of flow rate variations at different regions. The degree of influence of the flow velocity of the air in the main air passage upstream of the joining outlet is controllable by varying the height of protrusions provided on both side faces of the bridge.

It is also possible to take the air from various regions in the main air passage upstream of the flow rate measuring device thereinto, while giving a preselected order of preference to these regions, by stepping the inlet surface in which the inlet of the sub-air passage opens.

It is thus possible to obtain an air flow rate measuring device of reduced output variation despite any change in the configurations of the air cleaner and duct upstream of the measuring device, by optimizing the factors such as positions and size of the inlet opening and the joining outlets and the configurations of the protrusions disposed upstream of the joining outlets.

DESCRIPTION OF THE PREFERRED EMBODIMENTS

Preferred embodiments according to the present invention will be described with reference to FIGS. 1 to 32.

Figure 1:
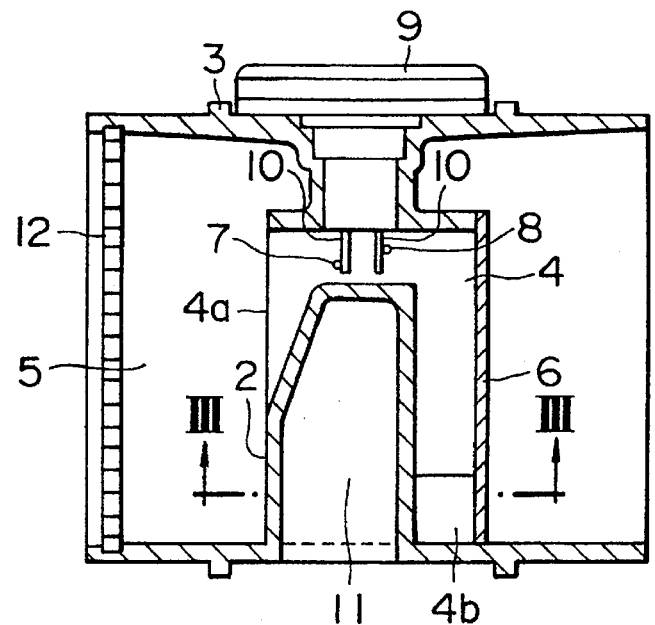
FIG. 1 is a sectional view of a first embodiment of the air flow rate measuring device in accordance with the present invention.
Figure 2:
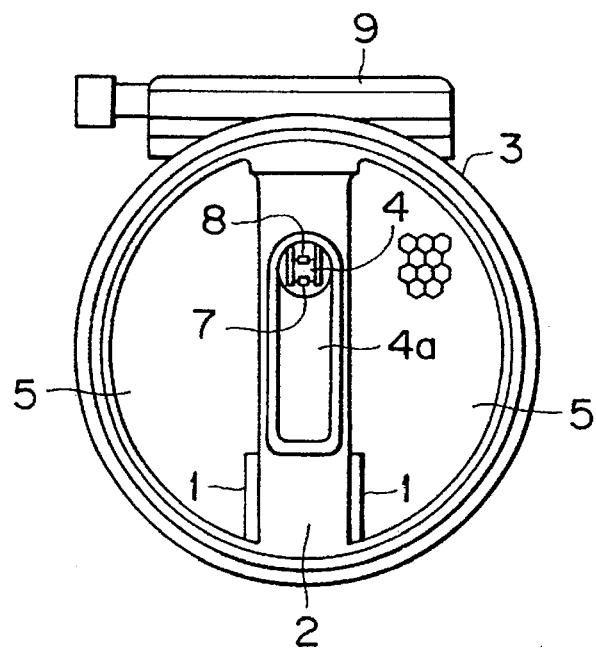
FIG. 2 is a view of the first embodiment as viewed in the axial direction from the upstream side of the air flow rate measuring device.
Figure 3:
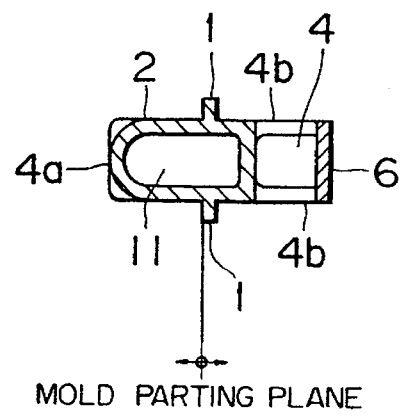
FIG. 3 is a sectional view taken along the line III—III of the first embodiment.

FIG. 1 is a sectional view of the first embodiment of the air flow rate measuring device according to the present invention, FIG. 2 is an end view as viewed from the upstream side (left side as viewed on FIG. 1) and FIG. 3 is a sectional view taken along the line III—III of FIG. 1.

The air flow rate measuring device has a body 3 in which is defined a main air passage 5. A bridge 2 is formed in the body 3 so as to bridge opposing sides of the wall of the body 3 across the main air passage 5. A sub-air passage 4 formed in the bridge 2 is provided with a heat-generating resistor 7 for detecting the air flow rate and a heat-sensitive resistor 8 for detecting the temperature of the intake air. The heat-generating resistor and the heat-sensitive resistor are electrically connected to a module 9 incorporating a driving circuit, through a support member 10. The sub-air passage 4 has an axial portion which has a sub-air passage inlet 4a and extends in parallel with the main passage 5. The axial passage is orthogonally bent at a portion thereof downstream of the flow rate measuring portion where the heat-generating resistor is disposed, thus forming a diametrical portion which extends to open in a joining outlet 4b. The main air passage 5, the bridge 2 and the sub-air passage 4 are integrally formed in the body 3.

The axis of the axial portion of the sub-air passage 4 is offset from the axis of the main air passage 5. The sub-air passage inlet 4a is extended to include the central portion of the main air passage 5 and has a tapered bottom so that the air falling within the area of the inlet 4a is introduced into the sub-air passage to reach the flow rate measuring portion.

According to this arrangement, the portion of air flow in the central region of the main air passage 5, the velocity of which substantially approximates the velocity of the uniform flow of air, is introduced even when such a non-uniform flow distribution or offset of air flow exists that exhibits low flow velocity at the upstream side of the axial portion of the sub-air passage 4. This arrangement reduces deviation of the output of the air flow rate measuring device from the value which would be obtained if uniform flow of air is formed without any offset in the main air passage 5.

As will be seen from FIG. 3, protrusions 1 are formed on both sides of the bridge 2 upstream of the joining outlet 4b of the sub-air passage 4 where the air from the sub-air passage 4 joins the air flowing through the main air passage 5. The air flowing in the main air passage 5 along both side faces of the bridge 2 collides with the protrusion 1, 1 so that, by increasing the velocity of the principal air flow, separation or burble of air flowing from the side faces of the bridge 2 is caused in the vicinity of the joining outlet 4b, with the result that the pressure of air in the main air passage 5 is reduced in this region so that the air which has been introduced into the sub-air passage 4 can be discharged through the joining outlet 4b without interference by the flow of the air in the main air passage 5. Thus, the discharge of air from the sub-air passage 4 through the joining outlet 4b is promoted. Consequently, the rate of flow of the air inside the sub-air passage is enhanced as the flow velocity is increased in the region of the main air passage 5 upstream of the joining outlet 4b, by virtue of the provision of the protrusions 1, 1.

When the flow of the air in the main air passage upstream of the measuring device has such a curve-shaped velocity distribution that the flow velocity of the air is highest in the central region of the main air passage, the output of the air flow rate measuring device tends to err on the high side because the sub-air inlet 4a is so shaped as to take up the portion of the air flow in the central region of the main passage 5. Such deviation of the measuring output, however, is suppressed in the described embodiment for the following reason. Namely, when such a curve-shaped flow velocity distribution exists, the flow velocity is comparatively small in the region around the joining outlet 4b which is disposed in the vicinity of the wall of the main air passage, and thus, the foregoing separation of the air flow is small. Consequently, the pressure reduction appearing in the region where the joining outlet 4b exists is smaller than the case where the flow velocity distribution is uniform, so that the rate of flow of the air through the sub-air passage 4 is reduced correspondingly, thus suppressing the above-described deviation of the measuring output.

In this embodiment, the bridge 2 having the sub-air passage 4 formed therein, the main air passage 5 and the mount for the circuit module can be formed integrally as a body 3 by plastic molding or by casting. In such a case, the diametrical portion of the sub-air passage 4 is obtained by forming a groove in the downstream side of the bridge 2 by molding or casting, and attaching a cover 6 to the downstream or rear ends of the side walls of the groove. The cover 6 extends to join the wall of the body 3 while the side walls of the groove are omitted at their ends adjacent the wall of the body so as to provide a pair of openings which open in the left and right sides of the bridge 2 thus forming the joining outlet 4b.

The vortices generated as a result of the burble of the air flow in the sub-air passage joining outlet 4b are largely influenced by the configuration of the upstream edge of each tabular protrusion 1. Namely, a greater burble effect is obtained even when the height of the protrusion is small, provided that the upstream edge of the tabular protrusion is not rounded. In order to obtain such non-rounded upstream edge of each tabular protrusion 1 without impairing durability of the mold, in the illustrated embodiment, the integral structure is formed by a split mold which has a parting plane coinciding with the plane of the upstream flat surfaces of the tabular protrusions 1, 1. In the molding or casting, a thick-walled portion can never be eliminated by vertical pattern drawing. In the illustrated embodiment, however, a vacant portion 11 opening in the wall of the body 3 is formed so as to prevent any deformation which otherwise may be caused by shrinkage of the thick-walled portion.

Figure 4:
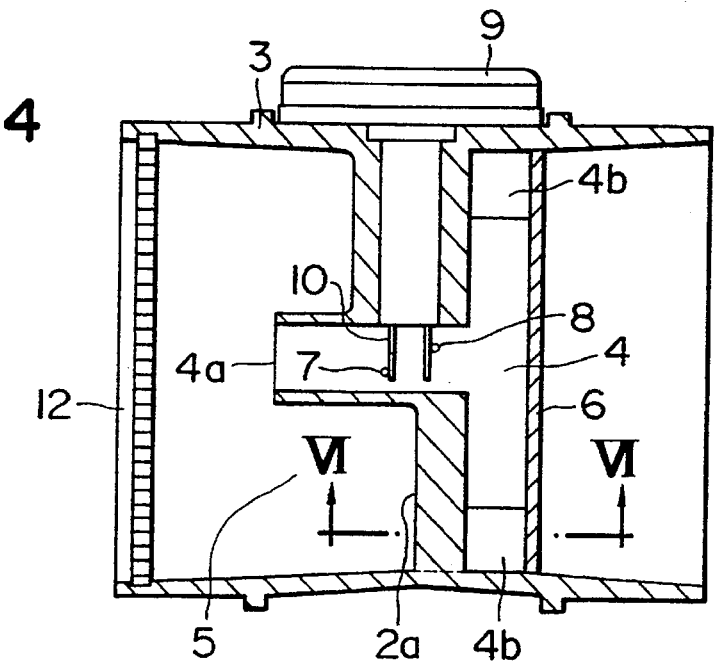
FIG. 4 is a sectional view of a second embodiment of the air flow rate measuring device in accordance with the present invention.
Figure 5:
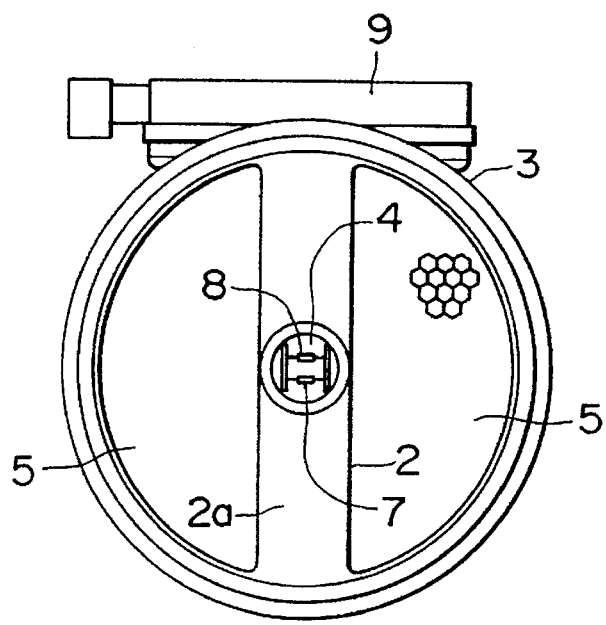
FIG. 5 is a view of the second embodiment as viewed in the axial direction from the upstream side of the air flow rate measuring device.
Figure 6:
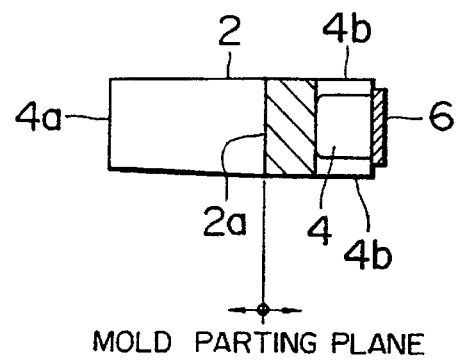
FIG. 6 is a sectional view taken along the line VI—VI of FIG. 4.

FIGS. 4 to 6 show a second embodiment in which an upwardly facing flat surface 2a is provided upstream of the joining outlet of the sub-air passage so as to generate burble vortices.

More specifically, FIG. 4 is a sectional view of the second embodiment, FIG. 5 is an end view as viewed from the upstream side (left side as viewed on FIG. 4), and FIG. 6 is a sectional view taken along the line VI—VI of FIG. 4.

As in the first embodiment shown in FIGS. 1 to 3, a main air passage 5 and a sub-air passage 4 are formed in a body 3 of the air flow rate measuring device. A flow rate measuring portion including a heat-generating resistor 7 and a temperature-sensitive resistor 8 is provided in the sub-air passage 4. In this embodiment, an inlet 4a of the sub-air passage is provided near the central region of the main air passage 5 and the sub-air passage 4 branches into a plurality of branches downstream of the flow rate measuring portion so as to provide a plurality of merging outlets 4b. Since the inlet 4a of the sub-air passage is disposed in the central region of the main air passage 5, it is possible to reduce the deviation of the measuring output to minus side when a stratified flow pattern is generated in the region upstream of the air flow rate measuring device. On the other hand, however, the deviation of the measuring output to the plus side is increased when the air flow in the main air passage exhibits such a curve-shaped flow velocity distribution pattern that the highest velocity appears in the central region of the main air passage. In order to suppress such deviation of the measuring output to the plus side, in this embodiment, the sub-air passage 4 is substantially orthogonally bent at a portion thereof downstream of the flow rate measuring portion and the joining outlets 4b of the sub-air passage 4 are disposed in the vicinity of the wall of the main air passage 5, with the above-mentioned flat surface 2a disposed upstream of the joining outlets 4 so as to extend normally to the principal flow of the air inside the main air passage 5.

In operation, air flowing in the main air passage 5 impinges upon the flat surface 2a so as to be distributed to both lateral sides of the flat surface 2a, thus forming burble vortices on the side surfaces of the bridge 2 downstream of the flat surface 2a. The greater the velocity of air impinging upon the flat surface, the more vigorous the burble vortices on the lateral side walls of the bridge. Therefore, the resistance posed by the principal flow of the air in the main air passage on the flow of the air coming out of the sub-air passage through the joining outlets 4b is decreased when the flow velocity of the principal flow of the air is increased at the regions upstream of the joining outlets 4b so as to generate large burble vortice, tending to increase the flow rate of air flowing in the sub-air passage. When the flow of air in the main air passage has such a curve-shaped velocity distribution pattern that the highest velocity appears in the central region of the main air passage, the flow velocity is high in the region upstream of the inlet 4a of the sub-air passage 4 and low in the regions upstream of the joining outlets 4b, tending to reduce the rate of flow of the air through the sub-air passage 4, thereby suppressing the deviation of the measuring output to the plus side which otherwise may be caused by the high velocity of the air flowing into the sub-air passage 4.

Figure 7:
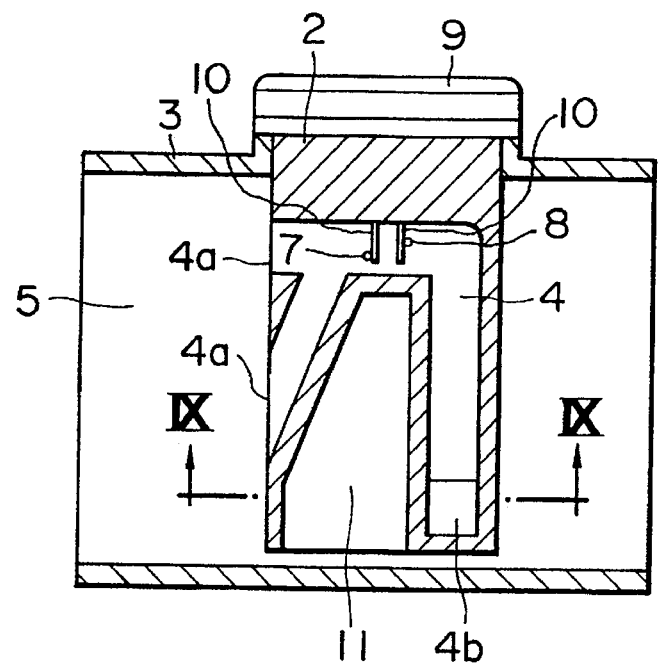
FIG. 7 is a sectional view of a third embodiment of the air flow rate measuring device in accordance with the present invention.
Figure 8:
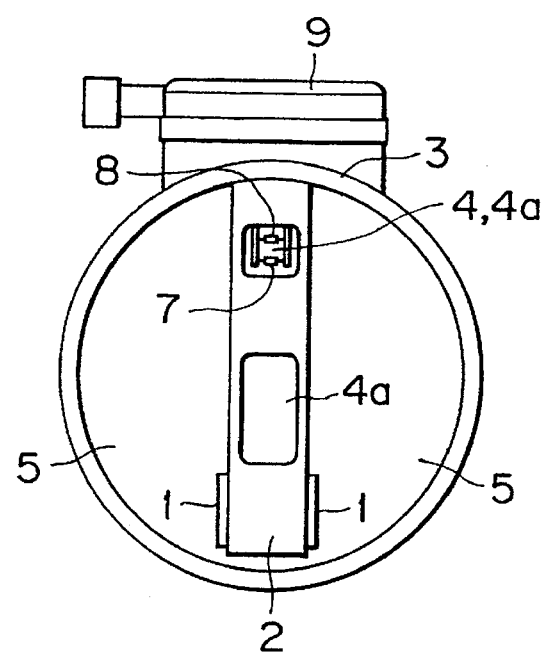
FIG. 8 is a view of the third embodiment as viewed in the axial direction from the upstream side of the air flow rate measuring device.
Figure 9:
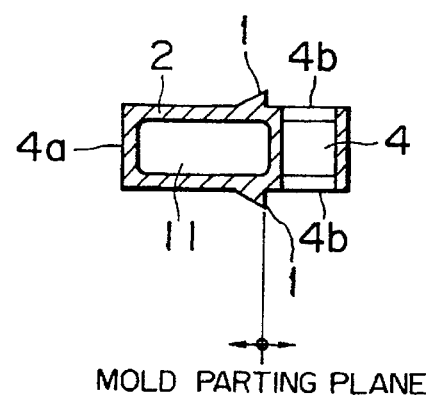
FIG. 9 is a sectional view taken along the line IX—IX of FIG. 7.

FIG. 7 is a sectional view of a third embodiment in which the circuit module 9 is integrated with the bridge 2 which is inserted into a hole formed in the wall of the body 3 so as to project into the main air passage 5. FIG. 8 is an end view of this embodiment as viewed from the upstream side, and FIG. 9 is a sectional view taken along the line IX—IX of FIG. 7.

In this embodiment, the sub-air passage 4 has two inlets 4a one of which opens in a region which contains the center of the main air passage 5. Conduits leading from these inlets 4a join each other at a portion upstream of the heat-generating resistor 7 so as to form an axial portion of the sub-air passage 4, which is then bent orthogonally to form diametrical portion of the sub-air passage 4. The body 3 has a simple cylindrical form, with the opening for receiving the bridge 2 and a seat for mounting the circuit module.

In this embodiment, protrusions 1, 1 having a triangular cross-section are provided on both lateral sides of the bridge 2 at positions immediately upstream of the joining outlets 4b so as to produce more stable burble vortices zones than the embodiments explained in connection with FIGS. 1 and 3. These protrusions 1, 1 produce almost the same effect against any offset or uneven flow velocity distribution as those produced by the protrusions of FIG. 3 and the flat surface of FIG. 6.

The bridge 2 can be formed by casting or molding by using a split mold having a parting plane which coincides with the downstream faces of the triangular protrusions. With such an arrangement, the triangular visor-shaped protrusion 1 can be shaped to have an apex of an acute angle and, hence, a reduced height.

Figure 10:
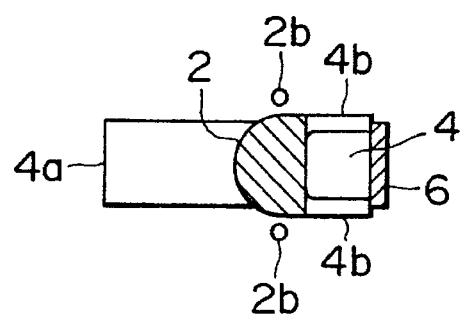
FIG. 10 is a sectional view of a modification of the first embodiment, taken along the line III—III of FIG. 1.
Figure 11:
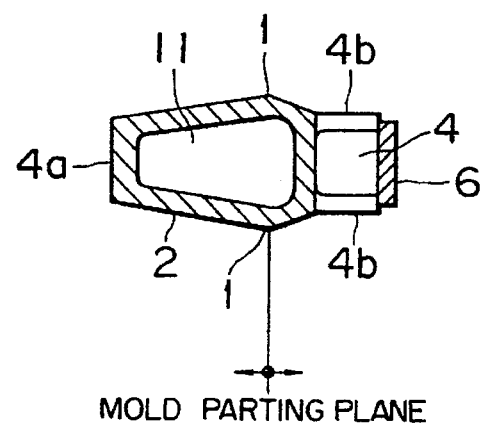
FIG. 11 is a sectional view of another modification of the first embodiment, taken along the line III—III of FIG. 1.
Figure 12:
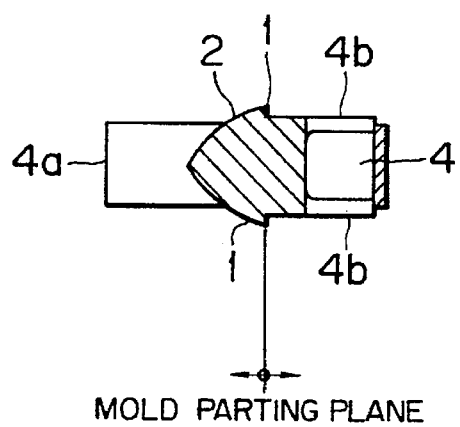
FIG. 12 is a sectional view of still another modification of the first embodiment, taken along the line III—III of FIG. 1.

FIGS. 10 to 12 show modifications of the embodiment shown in FIG. 1, having different arrangements for generating burble vortices. These modifications are typical three examples of the configurations of the above-mentioned arrangement other than those shown in FIGS. 3, 6 and 9, and are shown in section corresponding to the section taken along the line III—III of FIG. 1.

More specifically, in FIG. 10, the bridge has the same configuration as those of known air flow rate measuring devices. In FIG. 10, however, a pair of rod-shaped obstacles 2b are provided in the regions upstream of the joining outlets 2b in order to impede the principal flow of the air so as to generate burble vortices. In this modification, the surfaces of the bridge themselves do not cause burble of the flow of air but the rod-shaped obstacles 2b which are disposed in the vicinity of the bridge cause impediment to the principal flow of the air so that burble vortices are generated in the region immediately downstream of these rod-shaped obstacles 2b and immediately upstream of the outlets of the sub-air passage, thus producing the same effect as those produced by the protrusions or flat surface in the preceding embodiments. Although the obstacles having circular cross-section are employed in this modification, obstacles having other cross-sections such as rectangular or triangular sections may be used in order to enhance the effect of producing burble vortices.

FIG. 11 illustrates a modification of the arrangement shown in FIG. 9. Namely, in this case, each of the protrusions of triangular cross-section has an upstream slant surface which extends over a substantial length from one of the upstream end edges of the bridge 2 so as to converge towards the upstream end of the body of the flow rate measuring device, and a downstream end surface of the protrusion also is tapered to converge towards the downstream side. In this modification, the effect to produce the burble vortices is not so strong because the protrusions have gently slanted upstream and downstream surfaces. This arrangement, however, offers an advantage in that the velocity of the upstream air at which the burble takes place is varied adjustable by suitably selecting the tapers of the slant surfaces.

In the modification shown in FIG. 12, the bridge 2 is positioned at a level below the inlet 4a of the sub-air passage 4 in the region immediately upstream of the outlets 4b of the sub-air passage 4. In this modification, the bridge 2 is wedge-shaped such that its both side surfaces diverge towards the downstream end, rather than being provided with protrusions on its both lateral side surfaces. Thus, the flow of air colliding with the bridge is forced to change its flowing direction so that burble vortices are generated in the regions downstream of both side surfaces of the bridge. Thus, the modification shown in FIG. 12 can be considered as being a compromise of the embodiment in which the bridge has a flat upstream end surface normal to the flow of the air and the embodiments in which protrusions are formed on both lateral side surfaces of the bridge.

A description will now be given of a fourth embodiment according to the invention in which the influences of the air velocities in the regions upstream of the inlet and outlet of the sub-air passage are locally controllable, with specific reference to FIGS. 13 to 21.

Figure 13:
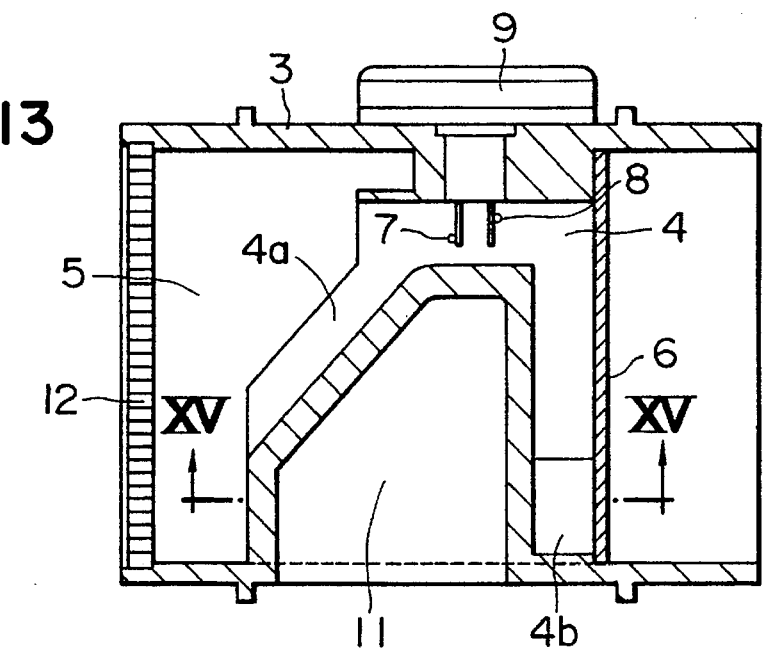
FIG. 13 is a sectional view of a fourth embodiment of the air flow rate measuring device in accordance with the present invention.
Figure 14:
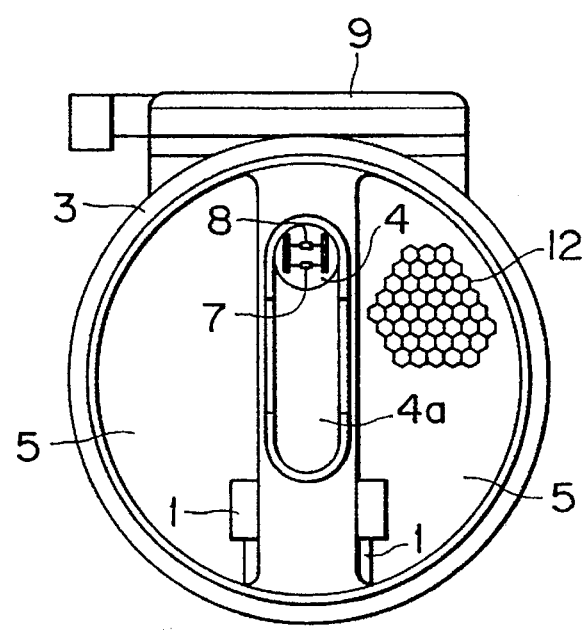
FIG. 14 is a view of the fourth embodiment as viewed in the axial direction from the upstream side of the air flow rate measuring device.
Figure 15:
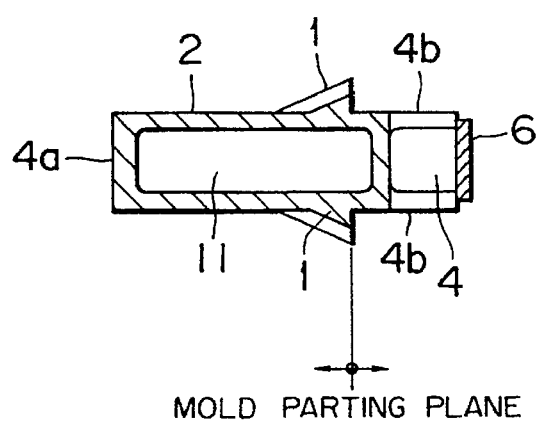
FIG. 15 is a sectional view of the fourth embodiment taken along the line XV—XV of FIG. 13.

FIG. 13 is a sectional view of the fourth embodiment according to the invention, FIG. 14 is an end view of the fourth embodiment as viewed from the upstream side and FIG. 15 is a sectional view taken along the line XV—XV of FIG. 13. The fourth embodiment of the air flow rate measuring device according to the present invention has a body 3 which defines a main air passage 5 and a sub-air passage 4 formed therein. The body 3 also has a structure for mounting and fixing a circuit module 9 thereon. A flow rate measuring element 7 is disposed to project into the sub-air passage 4 and is electrically connected to an electrical circuit in the circuit module 9. In this embodiment, an air temperature sensing element 8 also is fixed to project into the sub-air passage 4 as in the case of the flow rate measuring element 7. The sub-air passage 4 is orthogonally bent at a portion downstream of these elements 7, 8 so as to form a diametrically extending portion perpendicular to the direction of the principal flow of the air in the main air passage. The diametrically extending portion is formed by forming a downwardly facing diametrical groove and closing the groove by a cover 6.

The inlet 4a of the sub-air passage 4 also has the form of a groove which extends in the diametrical direction of the main air passage 5, with the bottom of the groove tapered upwardly rearward as viewed in FIG. 13. More specifically, the inlet surface of the sub-air passage 4 is stepped to have two portions; namely, a first upper step which is remoter from the flow rate measuring portion and closer to an upstream flow rectifying grating 12 and a second lower step closer to and axially aligned with the flow rate measuring portion and remoter from the grating 12, and the steps are connected by a tapered surface. The air which has just been discharged through the flow rectifying grating 12 has a large inertia acting in the direction of the principal flow of air, i.e., in the direction of axis of the main passage 5. Consequently, the first upper step of the inlet portion of the sub-air passage 4, which is closer to the grating 12, receives air having large inertia in the axial direction. In contrast, in the zone near the second step of the inlet portion of the sub-air passage 4, the flow of air tends to be deflected to the portions of the main air passage 5 on both sides of the sub-air passage 4, rather than coming into the sub-air passage 4 in which the air encounters with the greater resistance, because the inertial in the direction of the principal flow of air has been decreased when reaching the second step of the inlet portion which is remoter from the grating 12. Thus, in this embodiment, air is efficiently introduced into the sub-air passage also from the portion of the inlet which is diametrically spaced from the flow rate measuring portion because the inlet surface has such an upper step, in contrast to known flow rate measuring devices in which air could not efficiently be introduced from such inlet portion. Consequently, the flow rate of the air introduced into the sub-air passage more closely approximates the average value of the flow rate along the diametrical line of the main passage 5, whereby influence of any non-uniform flow distribution upstream of the flow rate measuring device is suppressed, thus offering a reduction in the error of the flow rate measurement. In this embodiment also, protrusions 1 are provided on the lateral side surfaces of the bridge upstream of the joining outlet 4b of the sub-air passage to enable adjustment of the rate of introduction of the air into the sub-air passage 4 due to the velocity of air flow upstream of the outlet. In this embodiment, the protrusion 1 also is stepped to have two portions of different heights to enable adjustment of the influence of the air flow velocity upstream of the outlet of the sub-air passage.

Figure 16:
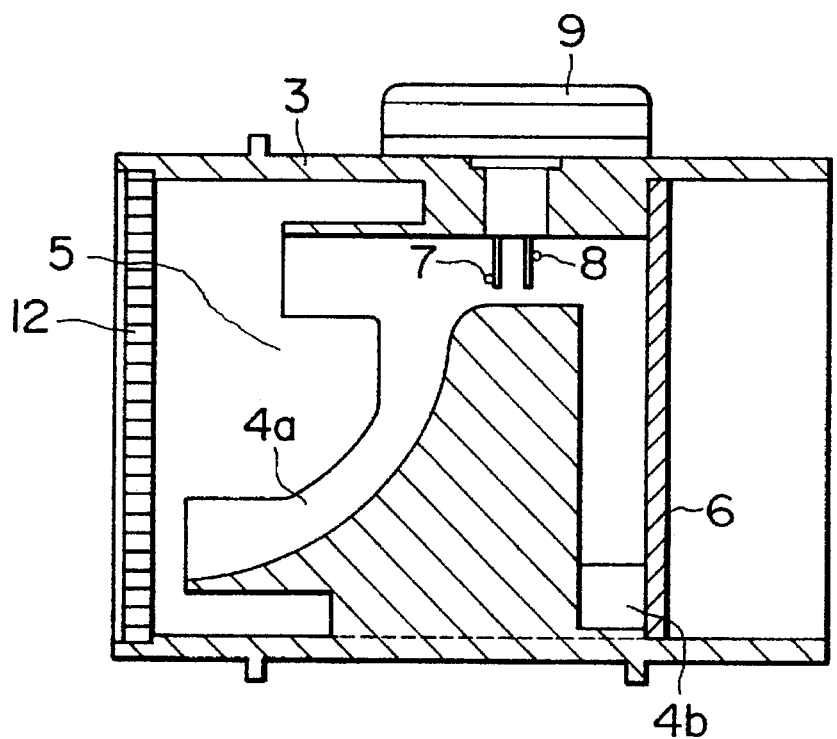
FIG. 16 is a sectional view of a fifth embodiment of the air flow rate measuring device in accordance with the present invention.

FIG. 16 shows a fifth embodiment of the flow rate measuring device in accordance with the present invention in which, as in the case of the fourth embodiment, the inlet 4a of the sub-air passage is stepped according to the diametrical distance from the flow rate measuring portion so as to provide a local selectivity or preference of introduction of the air into the sub-air passage 4. In this case, however, the configuration of the inlet 4a of the sub-air passage 4 as viewed in section shown in FIG. 14 is different from that of the embodiment shown in FIG. 13. More specifically, the inlet surface of the sub-air passage is so configured that one end portion of the inlet which is remotest from the flow rate measuring portion is positioned most upstream, i.e., closest to the flow rectifying grating 12, and the other end portion of the inlet which is closest to and axially aligned with the flow rate measuring portion is positioned downstream of the first-mentioned end of the inlet. Intermediate portion of the inlet between the above-mentioned two end portions is concave so as to be farthest from the grating 12, i.e., further to the downstream side beyond the position of the above-mentioned the other end portion of the inlet. According to this arrangement, air is less liable to be trapped at the intermediate portion of the inlet of the sub-air passage; namely, air is preferentially trapped and introduced into the flow rate measuring portion through the above-mentioned two end portions of the inlet. In this embodiment, therefore, introduction of air into the sub-air passage is suppressed in the region around the axis of the main air passage where the flow velocity is liable to fluctuate largely when offset or unevenness flow pattern of the air occurs, whereas introduction of air is promoted at both end portions of the inlet. Consequently, the air is introduced at a rate which approximates the mean of the flow rate of air at these two end portions of the inlet, thus diminishing error in the measurement output which otherwise may occur due to offset or unevenness of the flow pattern of the air.

The described embodiments can be produced without any rise in the production cost, because the inlet of the sub-air passage having the described configuration can easily be formed integrally with the body 3 by casting or plastic molding. In addition, the sub-air passage 4 can be bent orthogonally and the outlets of the sub-air passage can be formed to open in both lateral directions, so that the flow rate measuring device can produce a measuring output without any error caused by pulsation of the air flow and can be used stably for a long time against secular change which are caused by backfire from the engine or contamination.

Figure 17:
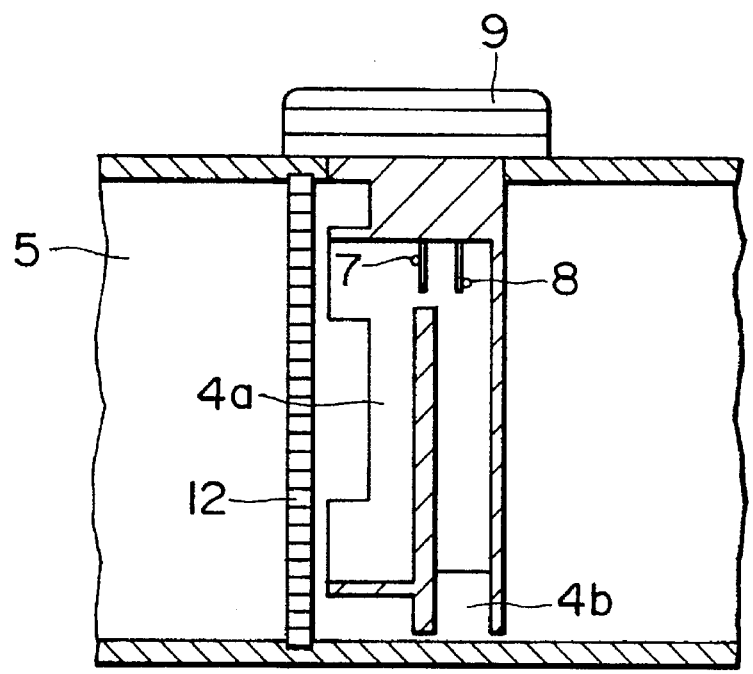
FIG. 17 is a sectional view of a sixth embodiment of the air flow rate measuring device in accordance with the present invention.

FIG. 17 shows a sixth embodiment of the flow rate measuring device in accordance with the present invention. In this embodiment, the main passage 5 is constructed as part of the intake system of an engine, and the sub-air passage 4 which is integrated with the circuit module 9 is inserted into the intake system, thus completing a structure which functions as a flow rate measuring device.

More specifically, a portion of the intake system, which forms the main air passage 5, is provided with a flow rectifying grating 12. The wall defining the main air passage 5 is provided at a portion thereof downstream from the grating 12 with an opening through which the assembly having the sub-air passage 4 is inserted into the intake system. The wall also is provided with a seat structure for mounting and fixing the circuit module 9 thereon. Thus, the assembly having the sub-air passage 4 and the circuit module 9 integrated therewith is inserted into the intake passage through the above-mentioned opening and is fixed as the circuit module 9 is seated on and fixed to the above-mentioned seating structure. This embodiment also can have a stepped inlet surface 4a of the sub-air passage 4 and orthogonal bend of the sub-air passage at a portion downstream from the flow rate measuring portion.

Figure 18:
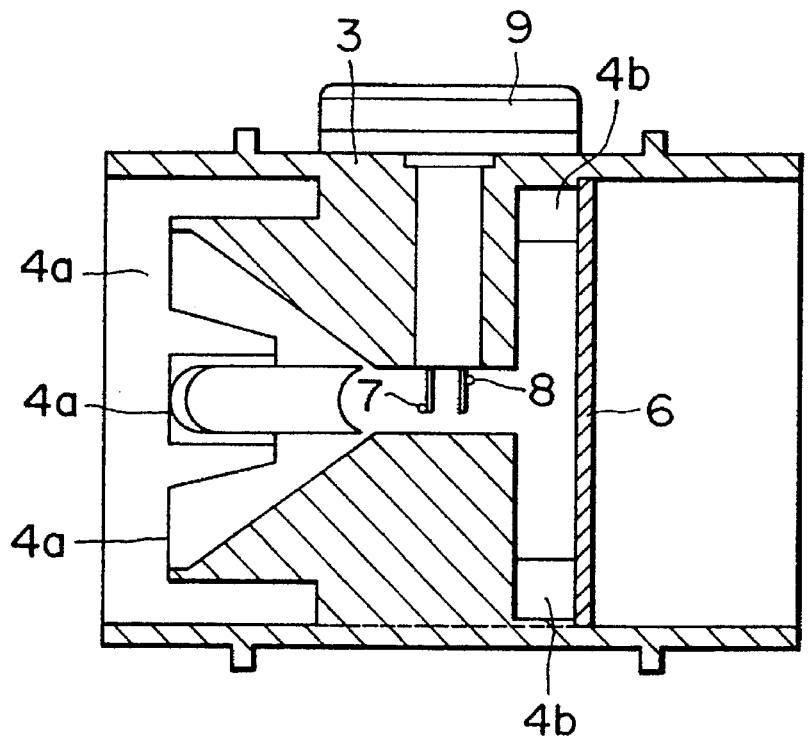
FIG. 18 is a sectional view of a seventh embodiment of the air flow rate measuring device in accordance with the present invention.
Figure 19:
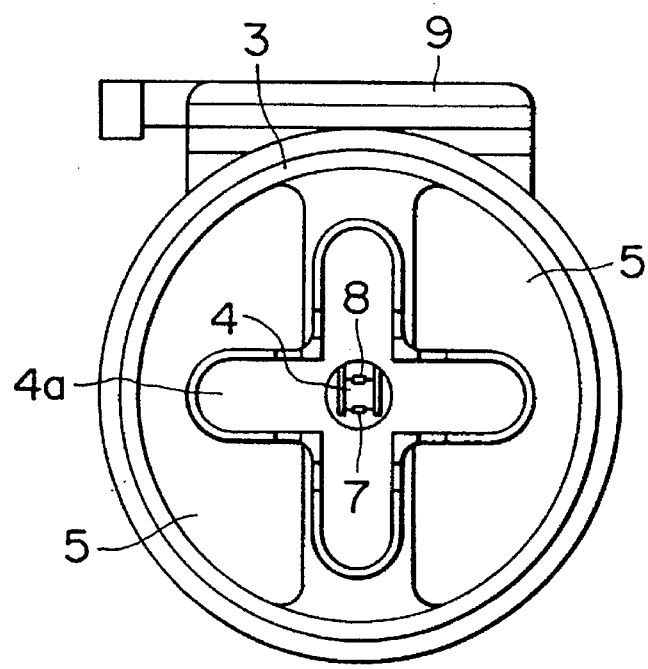
FIG. 19 is a view of the seventh embodiment as viewed in the axial direction from the upstream side of the air flow rate measuring device.

FIG. 18 is a sectional view of a seventh embodiment which has a greater area of the inlet through which the air is introduced into the flow rate measuring portion than the embodiments described hereinbefore, while FIG. 19 is an end view of this embodiment as viewed from the upstream side.

As in some of the preceding embodiments, the seventh embodiment has a main air passage 5 and a sub-air passage 4 which are integrally defined in a body 3. In this embodiment, the flow rate measuring portion in the sub-air passage 4, including a flow rate measuring element 7 electrically connected to a circuit module 7, is disposed on the axis of the main air passage 5.

In this embodiment, the inlet portion of the sub-air passage 4 has four slant grooves which extend radially so as to diverge from the flow rate measuring portion towards the upstream end, and the inlet surface 4a is configured to have two steps for each of these grooves: namely, an upper step which is on the radially outer upstream end of each groove and a lower step which is on the radially inner downstream end closer to the core region where the flow rate measuring portion is located. In general, in a flow rate measuring device of the kind described, there is a tendency that air is more likely to be introduced into the sub-air passage from the core or central region around the axis of the main air passage than from the outer peripheral region. In the seventh embodiment shown in FIGS. 18 and 19, however, a compensation is made for the above-mentioned tendency because the radially outer end portions of the groove, which are positioned upstream of the radially inner end portions, can trap or gather air more efficiently than the radially inner end portions, due to the above-described stepped configuration of the inlet surface. Consequently, air is introduced preferentially through the four radially outer regions which are remote from the flow rate measuring portion, so that rate of flow of air introduced to the flow rate measuring portion well corresponds to the mean value of the flow rates over the entire area of the cross-section of the main air passage.

Although the seventh embodiment is devoid of any flow rectifying grating, error in the measuring output caused by flow offset or uneven flow velocity distribution can be further diminished when a flow rectifying grating of mesh or honey-comb type is employed also in this embodiment.

Figure 20:
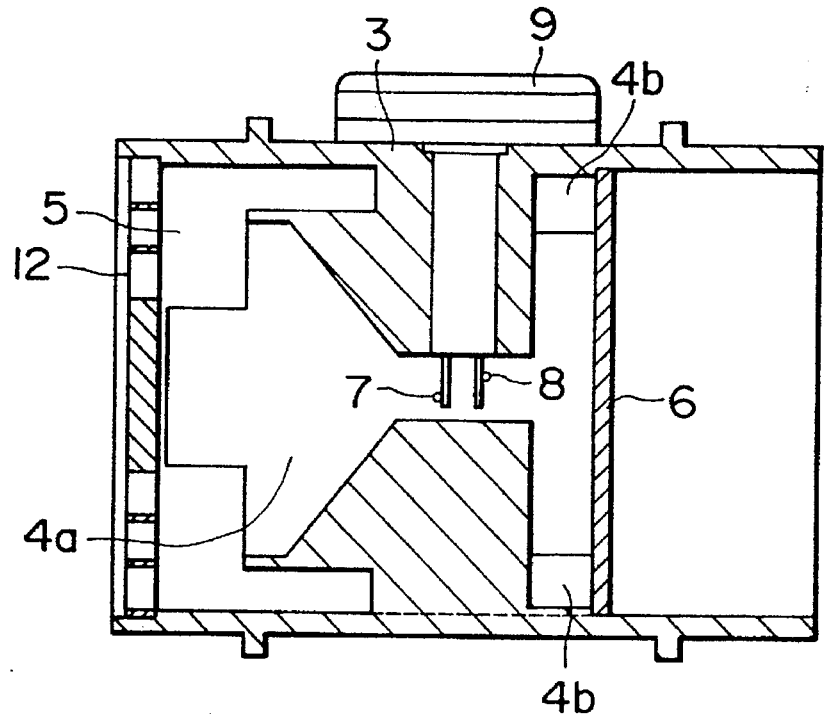
FIG. 20 is a sectional view of an eighth embodiment of the air flow rate measuring device in accordance with the present invention.
Figure 21:
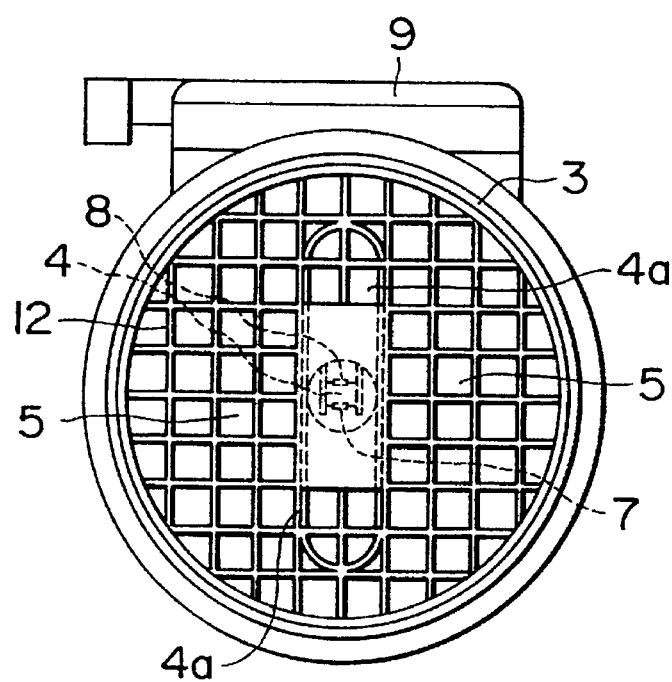
FIG. 21 is a view of the eighth embodiment as viewed in the axial direction from the upstream side of the air flow rate measuring device.

FIG. 20 is a sectional view of an eighth embodiment of the flow rate measuring device in accordance with the present invention, while FIG. 21 is an end view of the eighth embodiment as viewed from the upstream side of the embodiment.

In this embodiment, the inlet portion 4a of the sub-air passage is configured to have grooves which, when viewed from the upstream side, extends in a diametrical direction of the main air passage, with a bottom which converges towards the downstream flow rate measuring portion. The inlet surface is so stepped that the radially central region of the surface around the axis of the main air passage 5 is projected in the upstream direction towards the flow rectifying grating 12. The flow rectifying grating 12 has a central mask portion which is located on the axis of the main air passage 5 immediately upstream of the central projected portion of the inlet surface of the sub-air passage and which does not permit to air to pass therethrough. Consequently, the inlet surface of the sub-air passage 4 has two discrete inlet openings which are presented by radially outer ends of the diametrical groove when viewed from the upstream side of the grating 12, and air is introduced into the flow rate measuring portion through these two openings. In this embodiment, it is thus possible to selectively set a plurality of regions in the cross-section of the main air passage such that air is introduced from selected regions into the flow rate measuring portion, by suitably determining the configuration of the inlet portion of the sub-air passage and the shape of the flow rectifying grating 12. Consequently, air can be introduced from optimal portions of the main air passage against any uneven flow velocity distribution pattern. For instance, the flow rectifying grating having a central mask may be used in combination with the seventh embodiment shown in FIGS. 18 and 19, so that a flow rate measuring device is obtained in which air is introduced into a sub-air passage through for regions which are defined radially around the axis of the main air passage.

The eighth embodiment as described can be obtained by using the same components as those of conventional flow rate measuring device except for the configuration of the inlet of the sub-air passage and the mask of the flow rectifying grating. This embodiment, therefore, can have performance equivalent to those of known devices and, in addition, can suppress error in the output attributable to uneven flow velocity distribution. The inlet of the sub-air passage having the described configuration can easily be formed as a part of the body by casting or plastic molding, so that the flow rate measuring device can be produced without substantial rise of the production cost. The rectifying grating with the mask can be fabricated by molding from plastics or by press work, without requiring any separate or additional part for forming the mask and, therefore, can be produced at a cost lower than that of the known honeycomb or mesh type grating.

Figure 22:
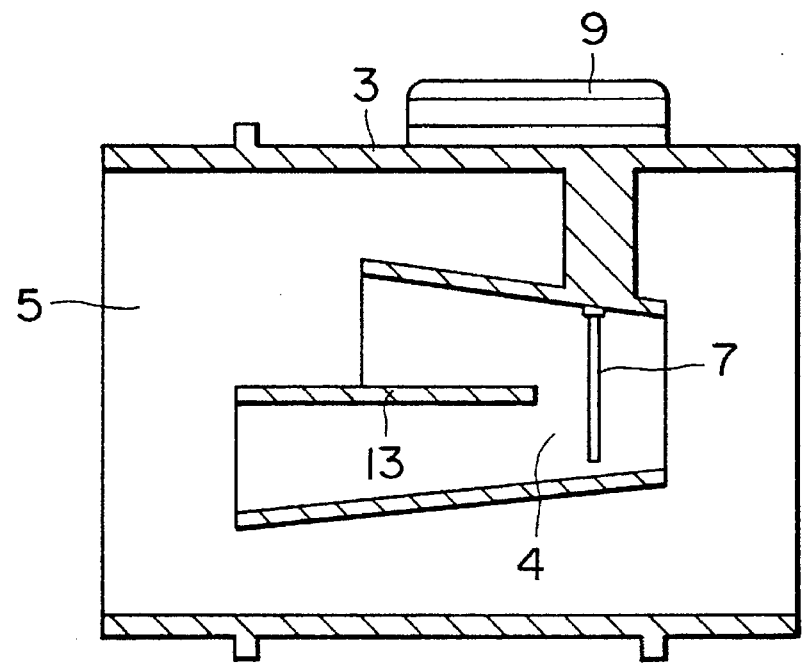
FIG. 22 is a sectional view of a ninth embodiment of the air flow rate measuring device in accordance with the present invention.
Figure 23:
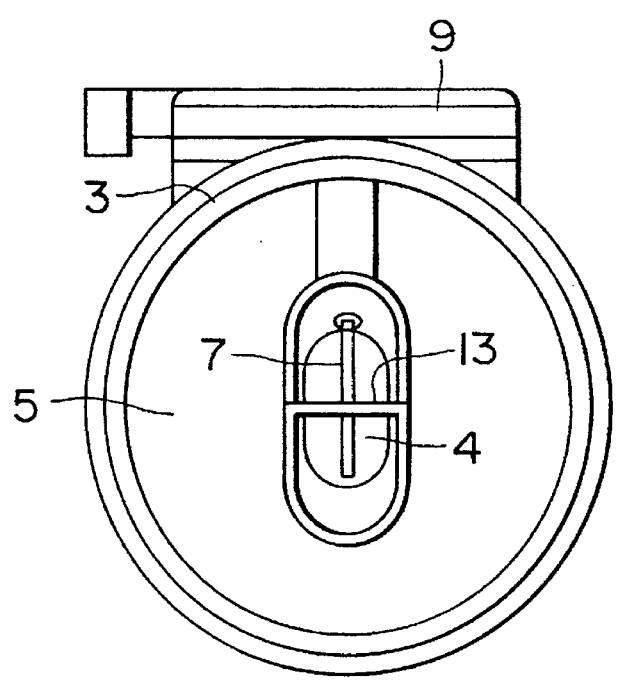
FIG. 23 is a view of the ninth embodiment as viewed in the axial direction from the upstream side of the air flow rate measuring device.
Figure 24:
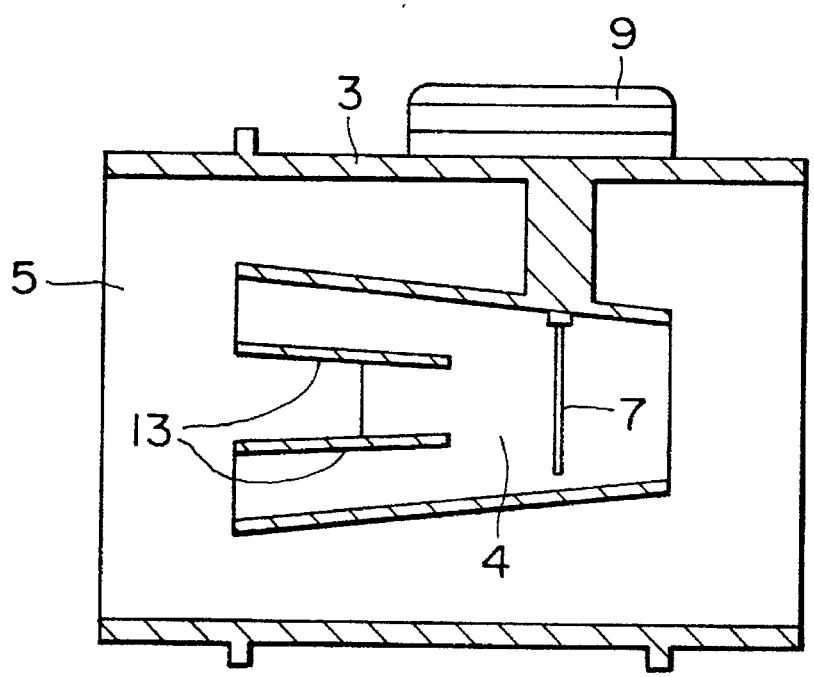
FIG. 24 is a sectional view of a tenth embodiment of the air flow rate measuring device in accordance with the present invention.

A description will be given of a ninth embodiment and a tenth embodiment each having a step in the inlet surface for the sub-air passage, with specific reference to FIGS. 22 to 24. FIG. 22 is a sectional view of the ninth embodiment, while FIG. 23 is an end view of the ninth embodiment as viewed from the upstream side. FIG. 24 is a sectional view of the tenth embodiment which presents almost the same appearance as the ninth embodiment shown in FIG. 23 when viewed from the upstream side.

The ninth and tenth embodiments employ elongated rod-shaped or tabular flow rate measuring elements 7. Description of the air temperature measuring element, configuration of the portion of the sub-air passage downstream from the flow rate measuring portion and the flow rectifying grating are not described in detail because they may be substantially the same as those in the preceding embodiments. Although the sub-air passage is illustrated to have an oval cross-section and to converge towards the downstream end, the sub-air passage may have a circular or other suitable shape of cross-section and need not converge along the longitudinal axis thereof.

The ninth embodiment shown in FIG. 22 has a stepped inlet surface for the sub-air passage 4, and a partition wall 13 which divides the interior of the sub-air passage into two portions is provided at the step of the inlet surface. This partition wall terminates at a point upstream of the flow rate measuring element 7 so that two portions of the sub-air passage join each other. The flow rate measuring element 7 is elongated in a direction substantially perpendicular to the partition wall 13 by a length large enough to receive fractions of air introduced through both portions of the sub-air passage.

This embodiment is intended to flatten as much as possible the flow velocity distribution pattern over a wide cross-sectional area of the main air passage and to measure the flow rate of the air on the basis of the flattened flow velocity distribution pattern by using the elongated flow rate measuring element, thereby diminishing degradation of the measuring performance attributable to local fluctuation of the measuring characteristics of the flow rate measuring element. Measuring error due to uneven flow velocity distribution upstream of the measuring device can generally be reduced by widening the area of measurement by the flow rate measuring element. Such enlargement of the measuring area, however, tends to impair the measuring performance due to local variation of the measuring conditions of the flow rate measuring element. Even when the flow rate measuring element has homogeneous structure, different measuring results are obtained at different portions of the flow rate measuring element. For instance, the measuring result obtained at the base or supported end portion of the flow rate measuring element is different from that obtained from the free end portion of the same. No substantial problem will be caused by local variation, if the flow of air impinging upon the flow rate measuring element has a uniform flow velocity distribution. Actually, however, different portions of the wide measuring area of the element receive air flow components of different flow velocities. Therefore, a mere widening of the measuring area cannot provide sufficient improvement in the measuring accuracy. The widening of the measuring area under non-uniform flow velocity distribution affects not only the measuring accuracy but also response of the flow rate measuring device to change in the flow rate, as well as secular change in the measuring performance due to, for example, deposition of foreign matters on the measuring element.

This problem can be appreciably overcome by flattening as much as possible the pattern of velocity distribution of air impinging upon the flow rate measuring element, by widening the area of opening of the sub-air passage and providing a step of the inlet surface in which the inlet of the sub-air passage opens.

For instance, the ninth embodiment shown in FIG. 22 employs a configuration of the sub-air passage 4 which can effectively be adopted when the air flowing through the main air passage has such a non-uniform flow velocity pattern that the velocity is higher in the region of the main air passage 5 closer to the circuit module 9, i.e., upper region as viewed in FIG. 22, than in the opposite region, i.e., the lower region as viewed in FIG. 22. Assuming here that the flow rate measuring device is devoid of the sub-air passage 4 or that the inlet surface of the sub-air passage 4 is neither stepped nor parted. In such a case, the upper portion of the flow rate measuring element 7 receives air of greater velocity while the lower portion of the same receives air of smaller flow velocity, as a result of the above-mentioned non-uniform flow velocity distribution pattern, posing a risk of degradation of the measuring performance described before. In the ninth embodiment shown in FIG. 22, however, the air flow component in the lower region having smaller flow velocity is preferentially taken into the sub-air passage, by virtue of the fact that the inlet surface for the sub-air passage is stepped and parted. Consequently, the difference between the velocity of air flow component colliding with the upper portion of the flow rate measuring element and the velocity of air flow component colliding with the lower portion of the same is reduced so as to suppress the risk of degradation of the measuring performance described before.

The tenth embodiment shown in FIG. 24 is intended for use in the case where the most ordinary flow velocity distribution pattern exists in the main air passage 5, i.e., when the flow velocity distribution pattern is such that the flow velocity is highest in the central region around the axis of the main air passage and is low in the peripheral region. In order to obtain high measuring accuracy despite such non-uniform flow velocity distribution pattern, the inlet surface in the tenth embodiment is stepped such that the central portion of the inlet surface for the sub-air passage 4 around the axis of the main air passage is recessed to the downstream side, so that air is less liable to be introduced through the central portion of the inlet as compared with the peripheral portion of the inlet, thus flattening the pattern of flow velocity distribution of the air impinging upon the flow rate measuring element 7.

The effect of eliminating the influence of non-uniform flow velocity distribution is enhanced when a flow rectifying grating is combined with these embodiments. These embodiments also may be modified such that the partition walls 13 are omitted.

Figure 25:
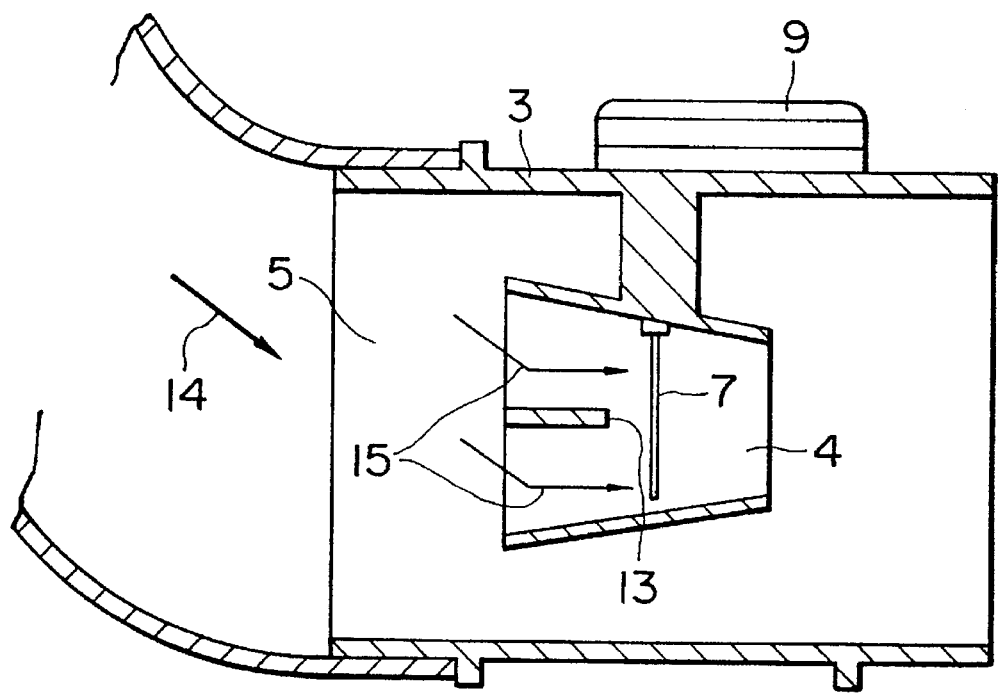
FIG. 25 is a sectional view of an eleventh embodiment of the air flow rate measuring device in accordance with the present invention.

FIG. 25 shows an eleventh embodiment of the flow rate measuring device according to the present invention in which the inlet surface of the sub-air passage 4 is flush. When the conduit or pipe upstream of the flow rate measuring device is bent as illustrated, the principal flow of air is directed as indicated by an arrow 14. Consequently, a non-uniform flow velocity distribution is formed in the body 3 such that the velocity is higher in the region near the lower end of the body 3 than in the region near the upper end of the body 3 as viewed in FIG. 25. Consequently, the free end portion of the flow rate measuring element 7 receives air of velocity considerably higher than that of the air received by the base end portion of the same element 7 adjacent to the circuit module 9, particularly when the flow rate measuring element 7 having a substantial length is used in such a structure that is completely devoid of the sub-air passage 4 or, even if the sub-air passage is provided, the sub-air passage lacks the partition wall 13 at the inlet thereof.

This problem is overcome by the eleventh embodiment in which, as shown in FIG. 25, the partition plate 13 is provided at the inlet of the sub-air passage 4. This partition plate effectively changes the flow velocity distribution pattern in the body 3 in such a manner as to reduce the difference between the velocity of the air flow component colliding with the free end portion of the elongated flow rate measuring element and the velocity of the air flow component colliding with the base end portion of the same. Consequently, the measuring condition is made more uniform over the area of the flow rate measuring element, thus avoiding degradation in the measuring performance attributable to the use of elongated measuring element.

The advantage according to the present invention will now be described with specific reference to FIGS. 26 to 30 which illustrate typical example of non-uniform flow velocity distribution which is caused by the presence of an air cleaner in an intake system of an automotive engine.

Figure 26:
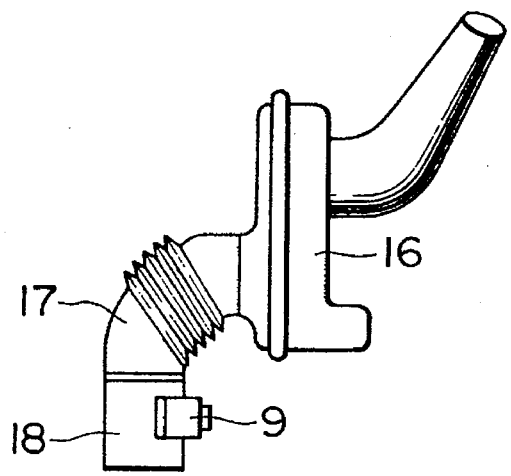
FIG. 26 is an illustration of an intake system.

FIG. 26 shows upstream portion of the intake system including an air cleaner housing 16 incorporating an air filter, a duct 17 forming a bent conduit connected to the outlet of the air cleaner housing 16, and an air flow rate measuring device connected to the downstream end of the duct 17.

Figure 27:
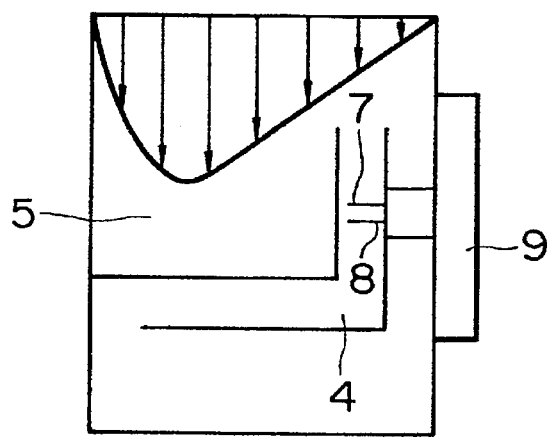
FIG. 27 is an illustration of an offset of air flow caused by the intake system shown in FIG. 26.

FIG. 27 schematically illustrates the pattern of flow velocity distribution which is formed in the region immediately upstream of the air flow rate measuring device by the presence of the intake system shown in FIG. 26.

Figure 28:
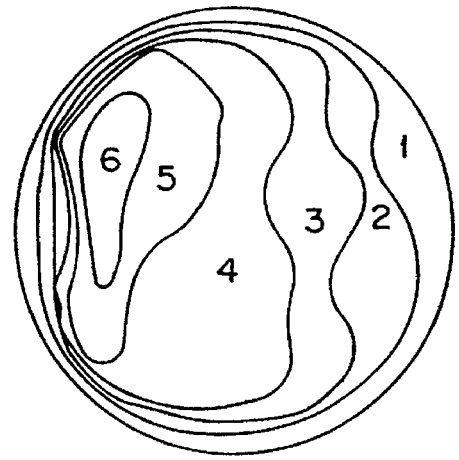
FIG. 28 is a diagram showing flow velocity distribution caused by the intake system shown in FIG. 26.

FIG. 28 is an equi-velocity diagram illustrative of the flow velocity distribution pattern obtained through an actual measurement in the region downstream of the intake system of FIG. 26, i.e., immediately upstream of the air flow rate measuring device. Greater numerals appearing in this diagram represent higher flow velocities of the air.

Figure 29:
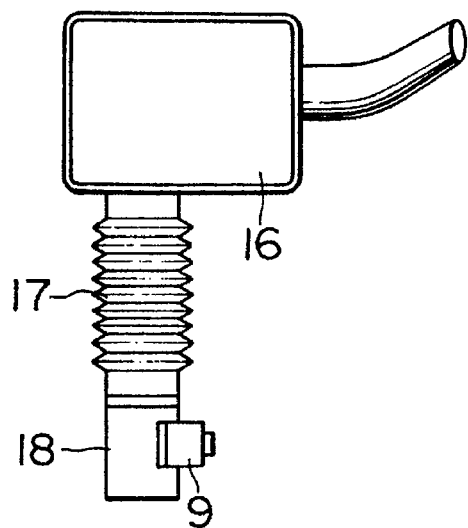
FIG. 29 is an illustration of another intake system.
Figure 30:
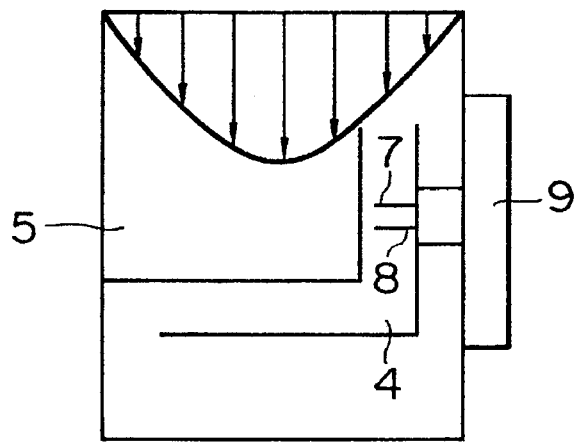
FIG. 30 is an illustration of an offset of air flow caused by the intake system shown in FIG. 29.
Figure 31:
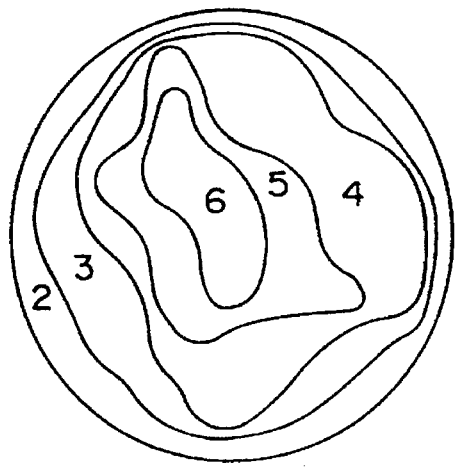
FIG. 31 is a diagram showing flow velocity distribution caused by the intake system shown in FIG. 29.

FIG. 29 shows another example of the intake system in which a straight duct 17 is connected to the outlet of the air cleaner housing 16, FIG. 30 shows the pattern of flow velocity distribution pattern formed by the intake system of FIG. 29, and FIG. 31 is an equi-velocity diagram showing flow velocity distribution based on velocity data as obtained by actual measurement in the region downstream of the intake system.

In general, an air flow rate measuring device of the type using a heat-generating resistor as the measuring element measures the total flow rate on the basis of a fraction or flow component which collides with small measuring element. Namely, as shown in FIGS. 27 and 30, the small measuring element 7 measures, as a representative value of the total air flow rate, the flow rate of the flow component which directly contacts the small measuring element 7. Consequently, a significant error tends to be involved in the measurement output particularly when there is a large difference in the flow velocity exists in the flow of air upstream of the flow rate measuring device. This problem would be overcome if a plurality of flow rate measuring elements are employed to measure the flow rates at different locations or when a flow rate measuring element having a length large enough to cover a wide region is employed. The use of many flow rate measuring elements or long element, however, is not preferred from the view points of production cost and producibility, and may adversely affect the performance of the whole system.

Under these circumstance, the present invention proposes to reduce the error or deviation of the measuring output attributable to the presence of non-uniform flow velocity distribution, by improving the construction of the air passages, without being accompanied by the above-described problems which are unavoidable when many flow rate measuring elements or a single element having a substantial length is used.

According to one aspect of the present invention, the deviation of the measuring output is compensated for by making use of difference between the velocity of air in the main air passage immediately upstream of the inlet of the sub-air passage and the velocity of air in the main air passage immediately upstream of the outlets of the sub-air passage. According to the invention, such a difference in the flow velocity is positively created by, for example, the provision of protrusions provided on both side surfaces of the structure defining the sub-air passage at positions immediately upstream of the outlets of the sub-air passage.

According to another aspect of the present invention, the deviation of the measuring output is compensated for by the specific construction which enables air to be introduced into the flow rate measuring portion from different regions of the inlet while giving selectivity or preference of a specific order to these different regions. Such selectivity or preference can be realized, for example, by adopting a stepped inlet surface in which inlet opening leading to the flow rate measuring portion opens. A mere widening of the inlet area to capture air from a wide region or a mere passage structure for joining flow components from different regions is impractical because such a measure causes a large drop of pressure. In contrast, in the present invention, the influence of non-uniform flow velocity distribution pattern existing upstream of the flow rate measuring device is effectively diminished simply by modifying the bridge portion which is used in known air flow rate measuring device of the kind described.

As will be seen from FIGS. 28 and 31, the flow velocity distribution over the cross-section perpendicular to the principal flow of the air exhibits such a pattern that the fraction or component of the highest velocity appears in the core region around the axis of the main air passage, i.e., the center of the above-mentioned cross-section. The influence of the non-uniform flow velocity distribution would be remarkably diminished if the flow velocity distribution pattern is flattened in such a manner as to reduce the influence of the central fraction or component of air flow of the highest velocity. Primarily, this could be done by providing a groove-like inlet for the sub-air passage on the upstream end of the bridge, with the bottom of the groove tapered to guide the air to the flow rate measuring portion. According to such a method, in order that the air is taken up from the entire area of the inlet, the bottom of the groove has to be inclined by a large angle from the plane perpendicular to the principal flow of air in the main air passage, with the result that the axial length of the air flow rate measuring device is inconveniently increased, causing various problems such as difficulty encountered in the mounting, rise in the production cost and undesirable effect on the performance of the whole system.

According to the invention, therefore, the inlet surface is modified only by such a degree that does not cause above-described problems. Namely, in the present invention, the inlet surface is simply stepped so as to enable adjustment or control of rates of introduction of air to the flow rate measuring portion from different regions of the inlet opening.

According to one aspect of the present invention, the positions of the inlet and the outlet of the sub-air passage are determined such that a large difference in the flow velocity is developed between the regions which are immediately upstream of the inlet and the outlet, e.g., such that the inlet and outlet are located at two points which are in symmetry with each other with respect to the axis of the main air passage or such that the inlet is located on the axis while the outlet is located on the axis while the outlet is located at a point near the wall of the body defining the main air passage. When the positions of the inlet and outlet of the sub-air passage are determined in the manner described above, such a relation exists that, as the velocity is increased or decreased in the region of the main air passage upstream of the inlet of the sub-air passage, the velocity is decreased or increased in the region of the main air passage upstream of the outlet of the sub-air passage. In order to make use of this relation, the present invention in its one aspect employs flow impediment portions such as protrusions provided on the side surfaces of the bridge at positions immediately upstream of the outlets of the sub-air passage, so that an automatic canceling or compensation function is performed to cancel the influence of the air flow component introduced from the region around the axis of the main air passage by the fact that, when the velocity of such central air flow component is increased tending to increase the rate of introduction of such component into the flow rate measuring portion, the pressure established immediately downstream of the protrusions is relatively elevated due to reduced air velocity in this region, thus suppressing the rate of introduction of the central flow component of the air into the flow rate measuring portion.

Figure 32:
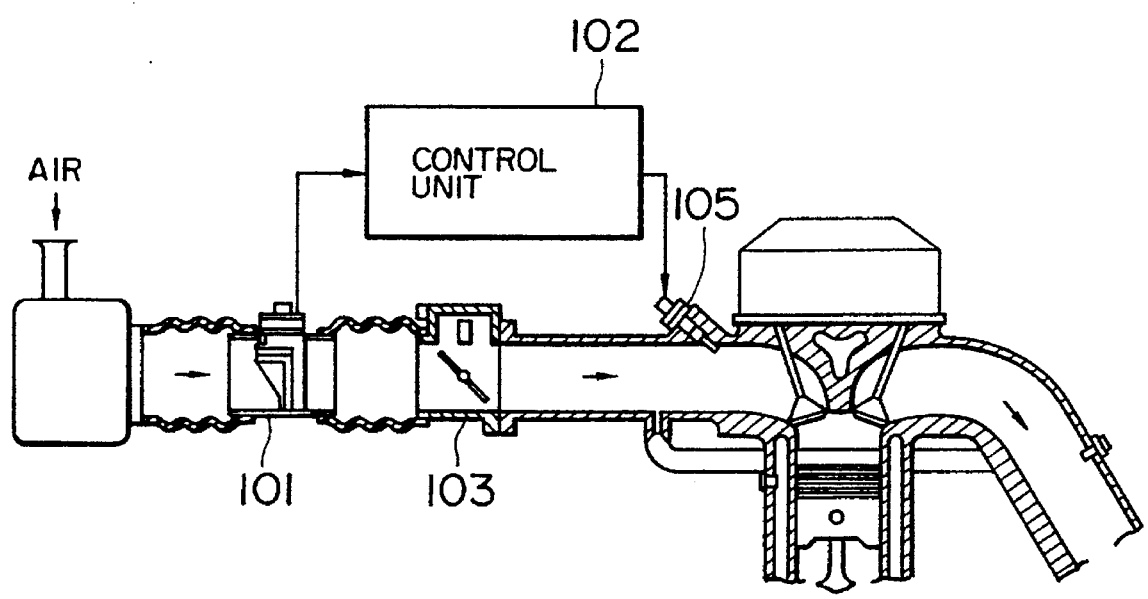
FIG. 32 is a diagrammatic presentation of an engine control system incorporating a twelfth embodiment of the air flow rate measuring device in accordance with the present invention.

FIG. 32 shows an engine control system incorporating a twelfth embodiment according to the present invention. An air flow rate measuring device, denoted by 101, produces a signal indication of the flow rate of the intake air. The signal is input to a control unit 102 which computes fuel injection rate and timing based on the detected intake air flow rate. The control unit 102 delivers signal indicative of the injection rate and timing to an injector 105. Numeral 103 denotes a throttle body which controls the flow rate of the intake air.

According to this arrangement, intake air flow rate is measured by the flow rate measuring device 101 without being affected by the construction of the whole system, so that the precision of control of the whole system can be enhanced.

Furthermore, according to the present invention, air can be introduced into the flow rate measuring portion of the sub-air passage from various regions of a cross-section of the main air passage perpendicular to the direction of principal flow of air, while giving preselected order of preference to these regions, thus making it possible to obtain an air flow rate measuring device which can provide a measuring output which is not substantially influenced by the pattern of flow velocity distribution in the region upstream of the flow rate measuring device.

What is claimed is:

1. An air flow rate measuring device, comprising:

a main air passage for intake air; and a sub-air passage for allowing part of air flowing in said main air passage to pass therethrough, said sub-air passage being provided with a flow rate measuring portion therein;

said sub-air passage having an inlet bounded by an inlet surface in which said sub-air passage opens, said inlet surface comprising first and second stepped portions, said first stepped portion being offset from said second stepped portion in a direction of flow of air in said main air passage.

2. An air flow rate measuring device according to claim 1, wherein the first stepped portion of said inlet surface is aligned with the flow rate measuring device, and is located downstream of the second stepped portion of said inlet surface.

3. An air flow rate measuring device according to claim 1, further comprising means for reducing pressure in said sub-air passage, disposed in a region of said main air passage upstream of said outlet of said sub-air passage.

4. An air flow rate measuring device according to claim 1, wherein said inlet surface of said sub-air passage has an inlet groove which expands in the radial direction of said main air passage.

5. An air flow rate measuring device according to claim 1, wherein said inlet surface of said sub-air passage has an inlet groove which extends radially outward from a region near the center of said main air passage.

6. An air flow rate measuring device according to claim 5, wherein the step of said inlet surface provides two portions of said inlet portion which are offset from each other in the direction of flow of the air, said inlet surface further having a tapered intermediate portion which interconnects said two portions of said inlet surface, the bottom of said inlet groove formed in said inlet surface also being tapered so that fractions of air introduced from different regions of said inlet groove are guided jointly into said flow rate measuring portion while being guided by said tapered bottom surface of said inlet groove.

7. An air flow rate measuring device according to claim 1, wherein said sub-air passage is bent substantially orthogonally at a portion thereof downstream of said flow rate measuring portion.

8. An air flow rate measuring device according to claim 1, wherein a pair of said outlets are provided and a pair of protrusions are formed in symmetry on both lateral sides of a bridge so as to form visors which covers said outlets against the flow of air.

* * * * *